(12) United States Patent
Cowan et al.

(10) Patent No.: US 6,230,836 B1
(45) Date of Patent: May 15, 2001

(54) AERODYNAMIC AUTOMOBILE

(75) Inventors: Ben Cowan; Marek A. Kmicikiewicz, both of Montreal (CA)

(73) Assignee: CKE Technologies Inc., St. Laurent (CA)

( * ) Notice: Subject to any disclaimer, the term of this patent is extended or adjusted under 35 U.S.C. 154(b) by 0 days.

(21) Appl. No.: 09/043,655

(22) PCT Filed: Sep. 24, 1996

(86) PCT No.: PCT/CA96/00637

§ 371 Date: May 26, 1998

§ 102(e) Date: May 26, 1998

(87) PCT Pub. No.: WO97/11874

PCT Pub. Date: Apr. 3, 1997

Related U.S. Application Data

(60) Provisional application No. 60/004,232, filed on Sep. 24, 1996.

(51) Int. Cl.[7] ........................................................ B60V 1/11
(52) U.S. Cl. ..................... 180/118; 180/89.1; 180/903; 180/291; 296/180.1; 296/185
(58) Field of Search ..................................... 180/116, 89.1, 180/117, 118, 903, 251, 291; 296/180.1, 185

(56) References Cited

U.S. PATENT DOCUMENTS

| | | | |
|---|---|---|---|
| 2,079,218 | * 5/1937 | Kedwinka | 180/54 |
| 2,118,550 | 5/1938 | D'Aubarede | 180/64 |
| 2,533,752 | 12/1950 | Alamagny | 180/21 |
| 2,612,964 | 10/1952 | Hobbs | 180/54 |
| 2,955,869 | 10/1960 | Blaser | 296/1 |
| 3,244,246 | * 4/1966 | Weiland | 180/7 |
| 3,922,014 | * 11/1975 | Hinderks | 293/88 |
| 3,951,222 | * 4/1976 | Fletcher | 180/1 R |
| 4,369,559 | * 1/1983 | Phillips | 29/401.1 |
| 4,772,062 | 9/1988 | Janssen et al. | 196/180.5 |
| 4,898,419 | * 2/1990 | Kenmochi et al. | 296/204 |
| 4,966,408 | 10/1990 | Yura | 296/185 |
| 5,924,763 | * 7/1999 | Daniels | 296/180.1 |

FOREIGN PATENT DOCUMENTS

| | | |
|---|---|---|
| 187 296 | 10/1936 | (CH) . |
| 976 991 | 10/1964 | (DE) . |
| 2087519 | 12/1971 | (FR) . |
| 2191519 | 2/1974 | (FR) . |
| 1454507 | 9/1973 | (GB) . |

\* cited by examiner

*Primary Examiner*—Lanna Mai
(74) *Attorney, Agent, or Firm*—Jacobson, Price, Holman & Stern, PLLC

(57) ABSTRACT

An automobile having a chassis and an outer cladding in the form of an airfoil with the top roof wall forming the pressure surface and the bottom wall the forming the suction surface with the front of the automobile acting as a leading edge and in the rear, the trailing edge.

5 Claims, 8 Drawing Sheets

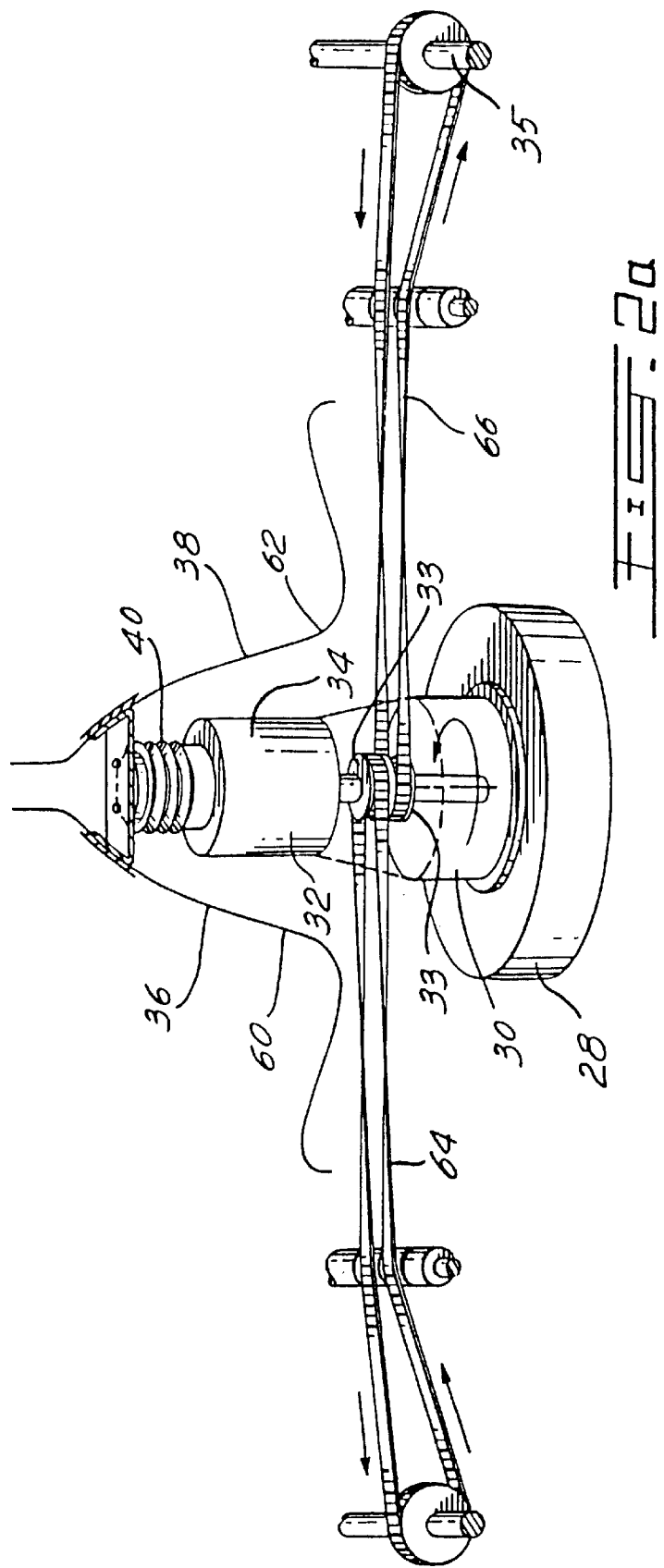

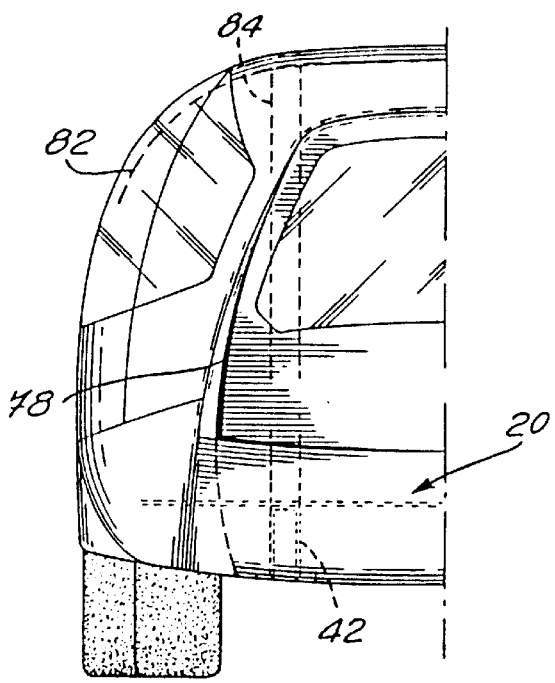
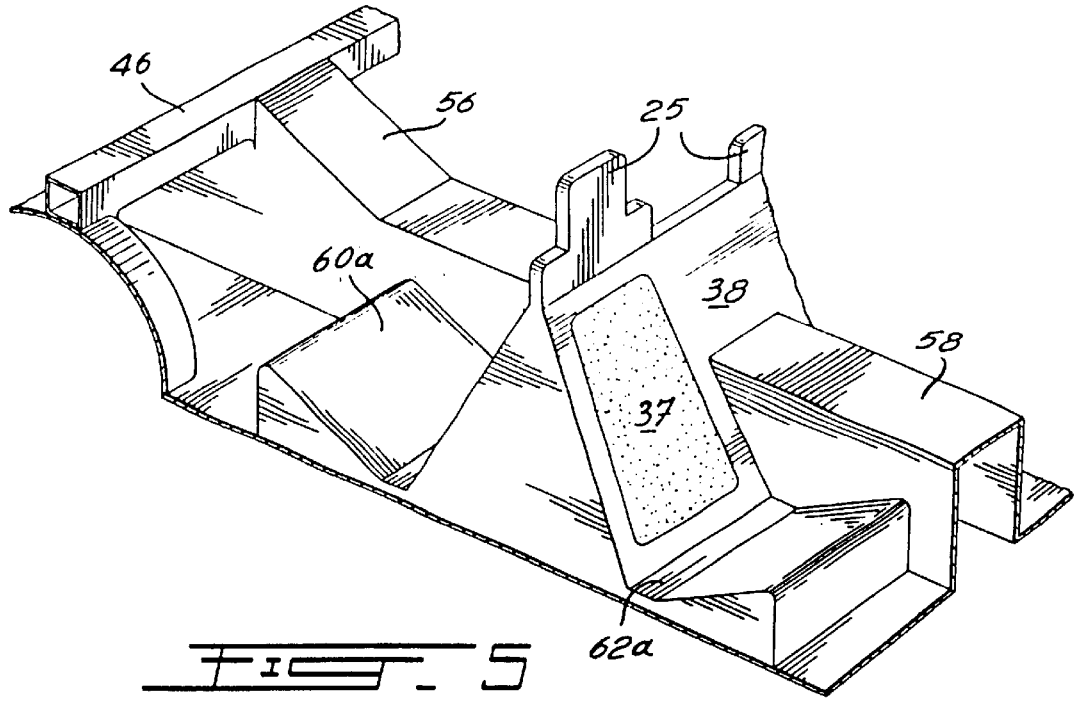

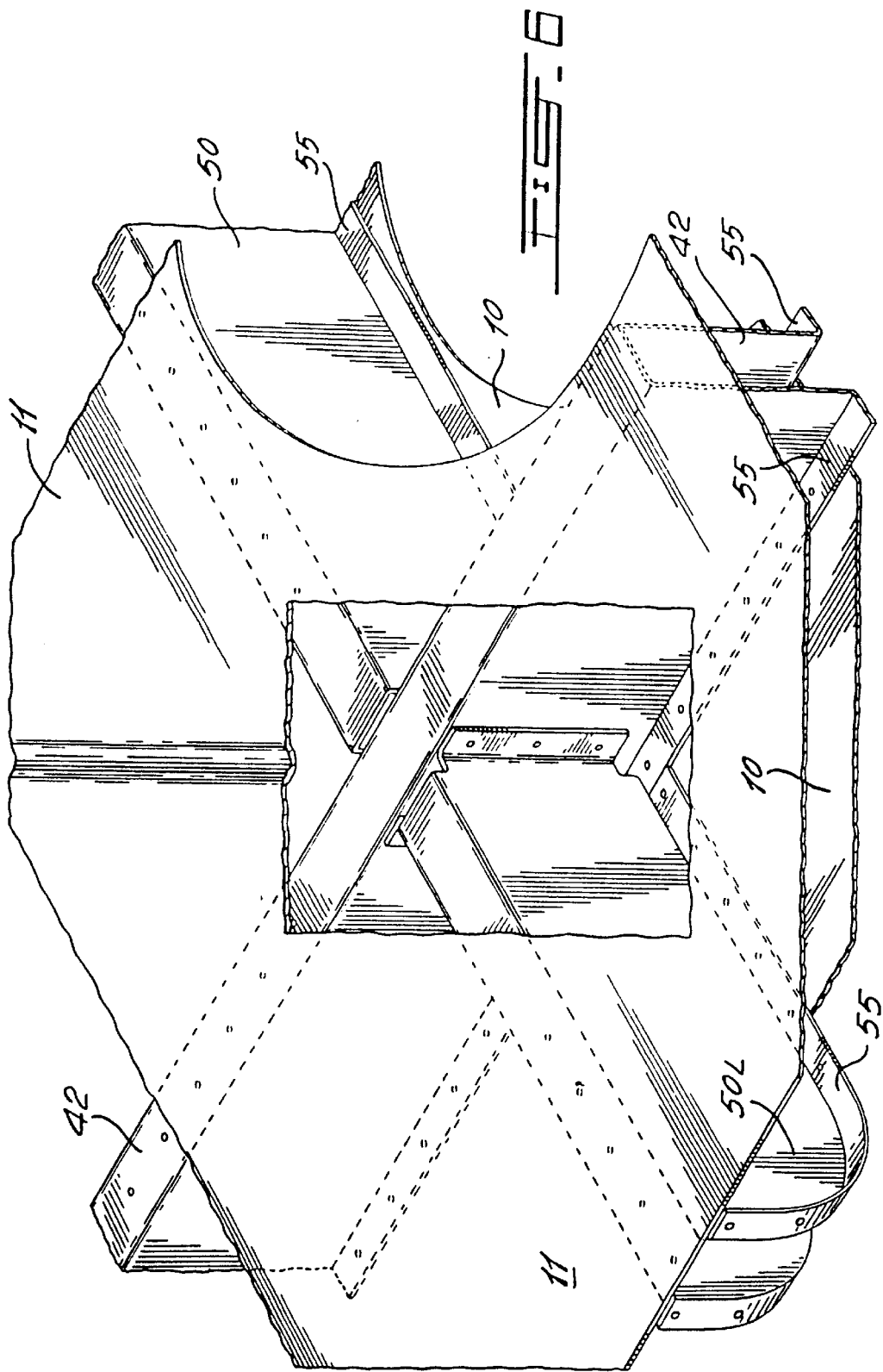

AERODYNAMIC AUTOMOBILE

This application claims benefit of Provisional application 60/004,232, filed Sep. 25, 1995, and is a 371 of PCT/CA96/00637, filed Sep. 24, 1996.

TECHNICAL FIELD

The present invention relates to automobiles, and more particularly, to a lightweight, passenger, self-propelled vehicle, with improved structural and body characteristics.

BACKGROUND ART

The conventional automobile often carrying a single driver-passenger, weighs on the average between 1000 and 1200 kg. and transports an average person of 70 kg. It is well settled that the conventional automobile is highly inefficient, particularly in a city environment in view of the amount of energy in the form of fuel required to move such a vehicle and resultant pollution. No matter how much research is done on engine efficiency, as long as the automobile has the mass referred to above.

In addition, conventional automobiles have a drag coefficient of $C_d$=0.38 or more. For highway driving, the drag coefficient increases the power requirements of the vehicle. Thus relatively powerful engines are required to overcome the mass and drag coefficient. Such engines add to the overall mass of the vehicle. Fuel consumption is rarely below 7 liters per kilometer.

One of the problems with lightweight vehicles is the lack of stability at higher speed. In order to attain a mass of less than 500 kg. the resulting vehicle would be fragile and somewhat unstable at speed of 100 km. or more, due to aerodynamic lift associated with most conventional body shapes.

U.S. Pat. No. 3,951,222, Fletcher, issued Apr. 20, 1976, shows a lightweight car in the form of a reverse airfoil. Although the aerodynamic lift associated with the automobile shown in this patent is reversed, the automobile in this patent would be subject to lateral instability.

DISCLOSURE OF THE INVENTION

It is an aim of the present invention to provide a lightweight vehicle with low serodynamic drag coefficient to thereby reduce the power requirements.

It is a further aim of the present invention to provide an inexpensive automobile construction providing reduced maintenance.

It is a further aim of the present invention to provide an automobile with reduced drag coefficient of $C_d$=0.20 or lower and a mass of less than 450 kg.

It is an aim of the present invention to provide an automobile of low mass but having aerodynamic features which render the automobile stable at higher speeds.

It is a further aim of the present invention to provide an automobile with relatively low fuel consumption.

It is a further aim of the present invention to provide a vehicle where the engine and transmission is concentrated in the center of the vehicle providing a low polar moment and improve vehicle handling.

It is a further aim of the present invention to provide an automobile with improved safety for the driver and passengers.

A construction in accordance with the present invention comprises an automobile having a chassis and an outer cladding in the form of an airfoil with a top wall forming the pressure surface, the bottom wall forming the suction surface, the front of the automobile forms the leading edge and the rear forms the trailing edge. At least a spoiler is provided at one of the front and rear portions of the automobile, the spoiler being located at the bottom wall near one of the leading edge and the trailing edge respectively. The spoiler extends transversely of the automobile and is spaced from the bottom wall to provide an air flow passage therebetween and form a downward force on the automobile.

In a more specific embodiment there is a front spoiler and a rear spoiler such that the spoilers provide a downward force on the automobile sufficient to provide stability thereto at high speeds. The spoilers also form the front and rear bumpers of the automobile.

In another aspect of the present invention the automobile is provided with an engine located centrally of the chassis and at the proximity of the center of gravity.

In a more specific embodiment of the present invention a pair of vertical stabilizer fins are provided at the trailing edge of the automobile and project rearwardly in order to provide lateral stability to the automobile and with an additional purpose of locating the pressure center of the automobile aft of the center of gravity of the automobile.

More specifically the present invention provides an automobile body with a drag coefficient of $C_d$=0.20 or lower. The total vehicle curb mass would be less than 450 kg.

Still more specifically the automobile is provided with a pair of bulkheads front and rear of the engine and defining an inverted V, the bulkheads forming backrests for oppositely disposed front and rear seats of the automobile.

Thus the structure of the automobile includes back-to-back four passenger seats with the back rests of the seats being integrated to the triangular configuration of structural bulkheads. The drive train is suspended from the apex of the structural bulkheads, including the engine which is located at the level of the floor. The floor is double clad including the bottom wall and includes storage for the gas tank, and in the event of conversion to an electrical motor, storage of the batteries.

BRIEF DESCRIPTION OF THE DRAWINGS

Having thus generally described the nature of the invention, reference will now be made to the accompanying drawings, showing by way of illustration, a preferred embodiment thereof, and in which:

FIG. 2a is a perspective view of a detail of the embodiment shown in FIG. 2;

FIG. 4 is a fragmentary rear and elevation of the embodiment shown in FIGS. 1 and 2;

FIG. 5 is a fragmentary perspective view of a detail of the present invention;

FIG. 6 is a fragmentary enlarged perspective view of a further detail of the present invention;

MODES FOR CARRYING OUT THE INVENTION

Figure 1:
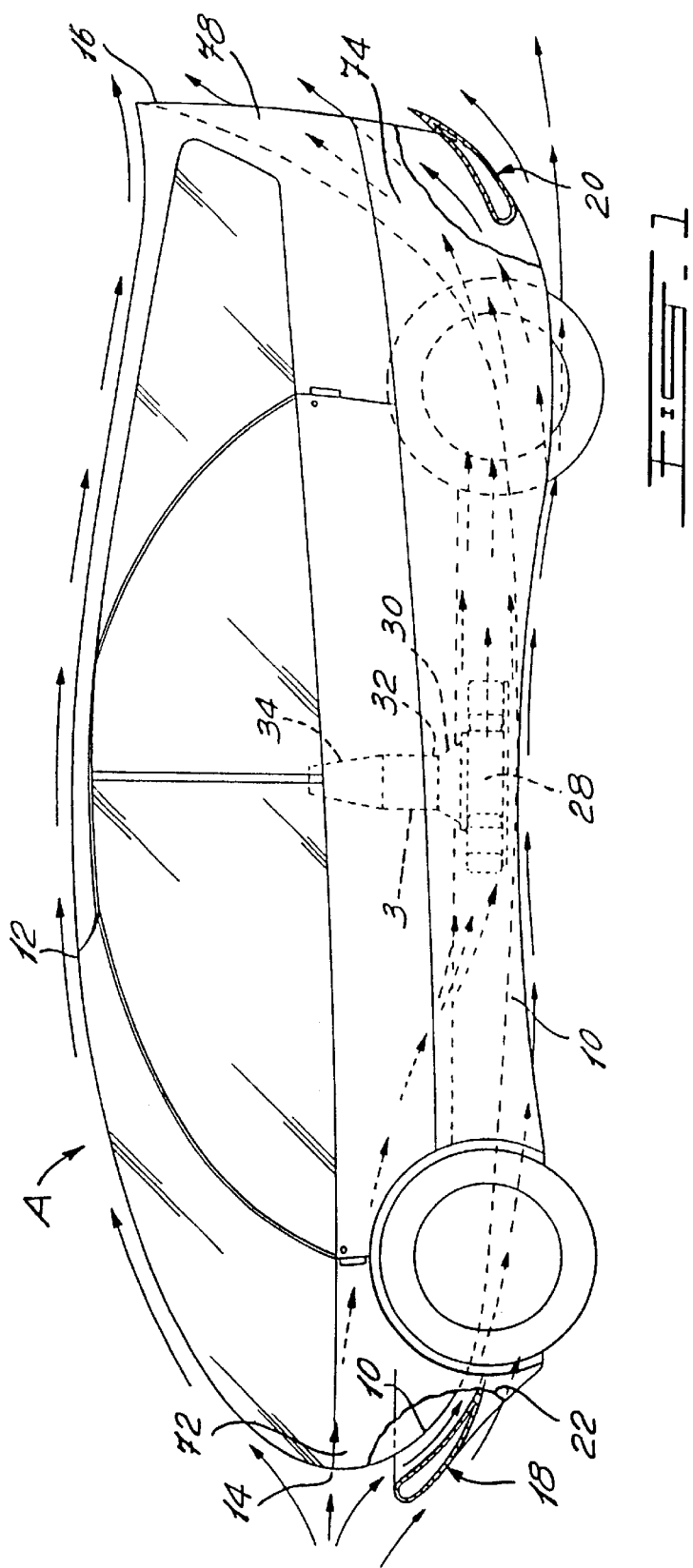
FIG. 1 is a vertical side elevation, partly in cross section, showing the air flow around the body of the vehicle.
Figure 2:
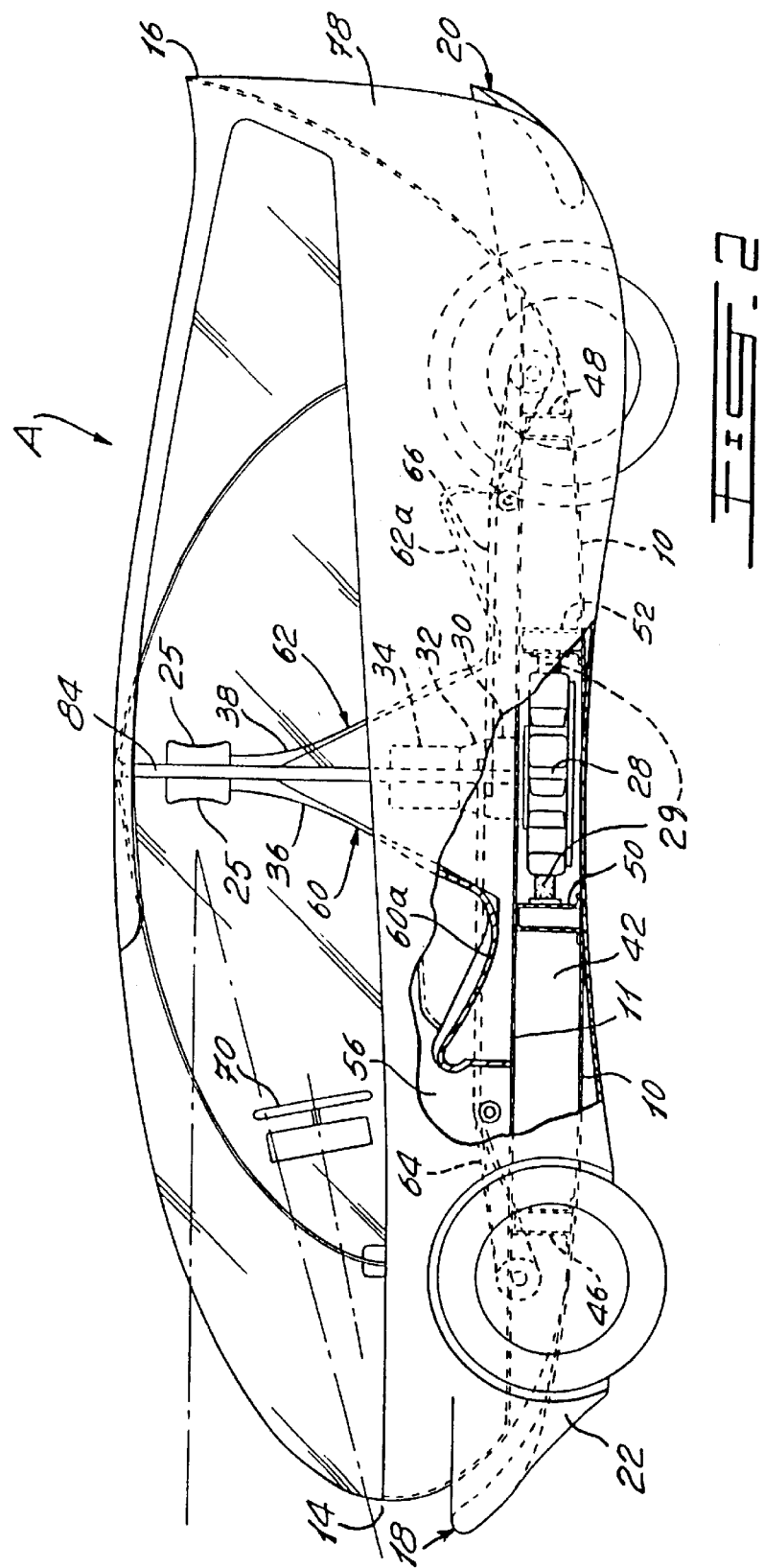
FIG. 2 is a side elevation, partly schematic and partly in cross-section, of the vehicle in accordance with the embodiment shown in FIG. 1 showing some elements in dotted lines.
Figure 3:
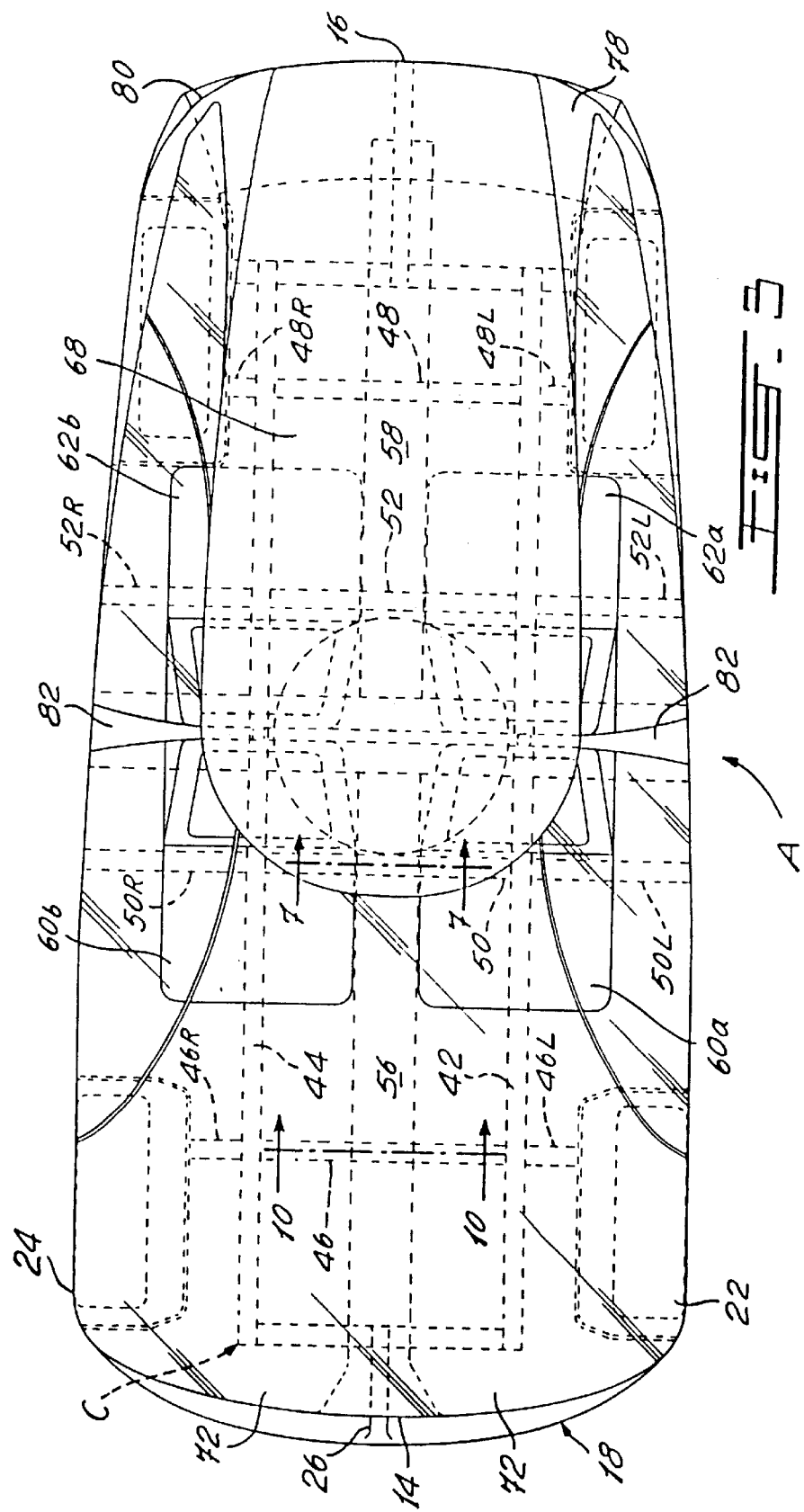
FIG. 3 is a schematic top plan view, of the vehicle shown in FIGS. 1 and 2.

Referring to FIGS. 1, 2 and 3, an automobile A is illustrated having a chassis C, a bottom clad wall 10 and a roof 12. The over all shape of the automobile A is that of an inverted airfoil having a leading edge 14 and a trailing edge 16.

As shown in FIG. 1, the configuration of the suction surface or clad bottom wall 10 and the pressure surface or roof 12 provides a negative aerodynamic lift at high speeds pressing the automobile towards the ground. This is enhanced by the spoilers 18 and 20 fore and aft of the automobile body A.

Figure 9:
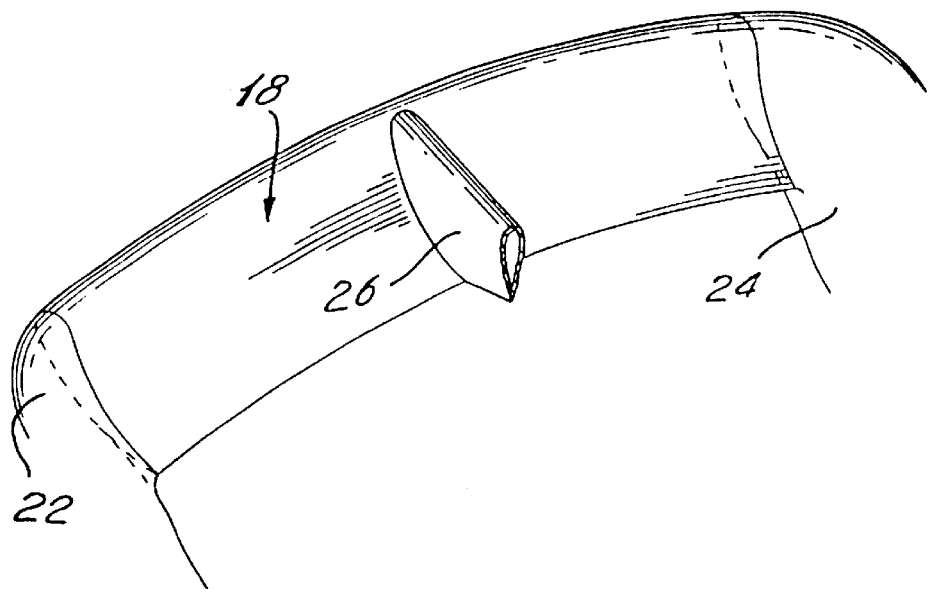
FIG. 9 is a fragmentary enlarged perspective view of a further detail of the present invention.

Spoiler 18 is illustrated in FIG. 9. Spoiler 20, shown in FIG. 1, is of similar construction. The spoiler 18 also serves as a bumper and extends transversely of the chassis and is connected at its ends to fender 22 and to fender 24 respectively. The spoiler 18 is spaced from bottom clad wall 10 and helps provide additional negative lift at the front of the vehicle. The spoiler 20 provides a similar negative lift at the aft portion of the automobile A. A central connecting member 26 mounted to the chassis C provides support for the spoiler 18, and, along with the laterally spaced fenders 22 and 24, guide the airflow underneath the automobile A.

The spoilers 18 and 20 each have a horizontal component $P_h$ a the front and rear of the automobile acting in opposite direction. When the airflow passes by the spoilers the $P_h$ component of each spoilers 18 and 20 cancels the other. In fact the forces are acting on the automobile structure to stretch it out. Vertical components $P_v$ press the car downwardly towards the ground, increasing the stability. The downward forces on the automobile increase the rolling resistance but this is by far compensated by the gains in stability.

As shown in FIG. 2, the engine 28 is placed centrally of the automobile A, in the lower part thereof. The engine 28 may be of the type described in U.S. Pat. No. 4,727,794, issued Mar. 1, 1988 to Marek Kmicikiewicz. Torque reaction pads 29 are provided to resist the torque developed by the engine 28. The drive train also includes a clutch housing 30 which can be a standard single disc dry clutch. An inter-axle differential 32 is superimposed with the a split power CVT transmission 34 of the type described in U.S. Pat. No. 5,121,936 issued Jun. 16, 1992 to Ben Cowan.

The drive train unit, including the above mentioned engine 28, clutch housing 30, differential 32 and transmission 34 is suspended from the apex of two bulkhead 36 and 38 which form a structural triangle as shown in FIGS. 2 and 5.

The bulkheads 36 and 38 also form the back rests of the seat sets 60 and 62. Panels 37 are removable, for access to the space between the bulkheads 36 and 38 where the engine transmission and other equipment are situated. It is noted that the engine and transmission could be removed in less than 30 minutes. Head rests 25 are illustrated at the top of the seats 60a, 60 b, 62a, and 62b, as shown in FIGS. 2 and 3. A suspension system 40 suspends the drive train from the apex of the bulkheads 36 and 38. The suspension of the drive train allows for better distribution of the loading forces on the chassis C.

Referring to FIGS. 2, 3, 5, 6, and 7, there is shown the chassis C which includes a double clad floor with spaced-apart panels 10 and 11. There are two longitudinal beams 42 and 44 which extend from the front cross beam 46 to the rear cross beam 48. The beams 46 and 48 are U-shaped stampings of aluminum and have outwardly extending flanges 55 for the purposes of bonding, and spot welding and riveting. The cross-section of a typical longitudinal beam 42 is shown in FIG. 6, cross or lateral beams 46, 48, 50 and 52 extend between beams 42 and 44. Beam extensions 46L, 46R, 48L, 48R, 50L and 50R, 52L and 52R, are provided outboard of beams 42 and 44 corresponding to the beams 46, 48, 50 and 52. All of the flanges 55 of the beams are bonded, riveted or spot-welded to the cladding as represented, for instance, by panels 10 and 11.

A tunnel having a front segment 56 and a rear section 58 extends longitudinally and centrally of the chassis C and within the passenger cabin dividing the two sets of seats 60 and 62, into seats 60a, 60b, 62a and 62b respectively, as shown in FIGS. 3 and 5. These tunnel sections 56 and 58, in addition to providing space for the power transmission elements, provide structural strength to the automobile for support of the front and rear bulkheads during crashes. The housings of tunnel sections 56 and 58 also provide additional stiffness to the overall structure of the chassis C.

The power transmission is provided to rear and front axles by cogged belts 64 and 66 extending in tunnel sections 56 and 58 respectively. These cogged belts 64 and 66 may be of the type referred to as Uniroyal HTD-II synchronous belt drive system, as described in a Uniroyal publication entitled "PowerTrain", October 1985, or the PowerGrip HTD belt system produced by The Gates Rubber Company and described in Gates Industrial Belt Products/List Prices, Jan. 2, 1990, No. 19996-000. the inter-axle differential 32 provides a torque split at the drive belts 64 and 66. The rate of torque split depends on the load distribution between front and rear axles, the height of the center of gravity of the automobile and the mode of driving, that is mainly city or highway. The cogged belt 66, as shown schematically in FIG. 2a, is in a möbius curve mode and twisted to transmit torque from the vertical axis sprockets 33 of the inter-axle differential 32 to the horizontal axis of the final drive differential. Belt 64 has a similar configuration. This arrangement is an efficient cost-effective noise and vibration reducing drive system for lightweight vehicles.

The gas tank 68 is located under the right rear passenger seat 62b and inboard of the right longitudinal beam member 44. The tank 68 is of 15 to 21 liter capacity and is thus protected from both side and rear impacts and provides the automobile with 500 to 700 kilometer range.

It is noted that the clad floor 10 may be provided with an opening below the drive train for access thereto.

The upper floor panel 11 may be provided with stiffening beads and openings to give access to some systems located in the double floor space. As indicated previously, the double floor concept allows for storage of batteries in the event of conversion to electric drive.

The steering column and instrument cluster 70 is adjustable in height and distance since the seats 60 are fixed. Similarly, the pedal cluster (not shown) is adjustable horizontally to compensate for different leg lengths. Since these two clusters, that is, the steering column and instrument cluster 70 and the pedal cluster, are independently adjustable relative to the fixed seat 60a, it is possible to obtain a better driving position for different persons, including those having shorter arms and longer legs, and vice versa.

An air intake 72 is provided at the front of the automobile C, as shown in FIGS. 2 and 3. The air follows a ventilation duct to the engine 28 in order to provide cooling air for the engine. The air intake 72 is located at the stagnation point at the leading edge 14, aerodynamically, on the automobile A where there is the highest possible static pressure developed. The air outlet 74 is in the form of tangentially oriented slots at the aft portion of the automobile A where the velocity of air is high and thus the negative pressure drawing the air from the exit is high. It is noted that a fan will be provided in the air outlet 74 to increase the negative pressure within the ventilation system for the engine.

Figure 7:
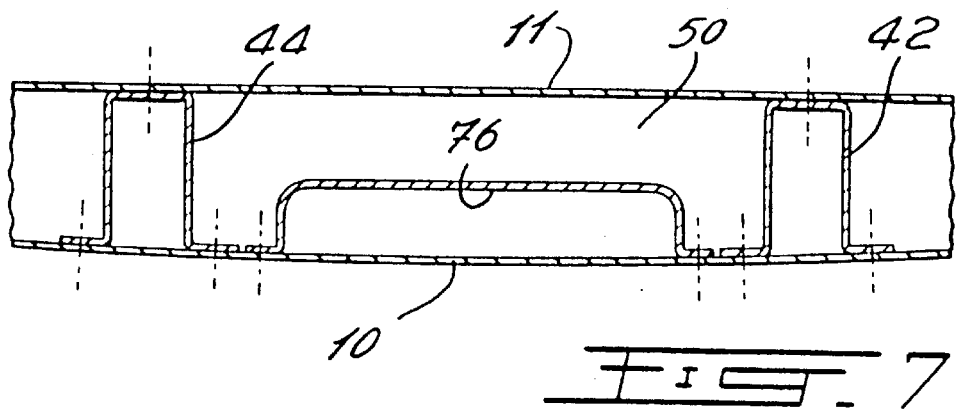
FIG. 7 is a fragmentary enlarged vertical cross-section of a further detail of the present invention taken along lines 7—7 of FIG. 3.
Figure 10:
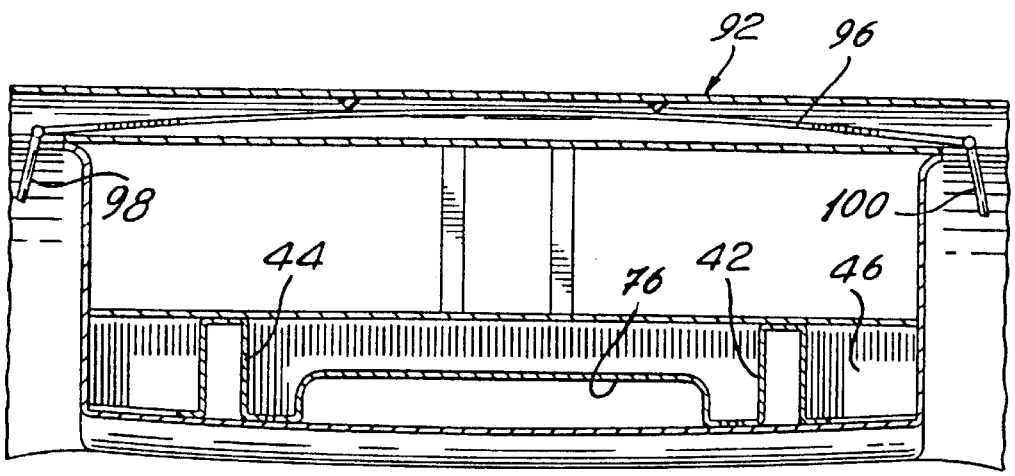
FIG. 10 is a fragmentary vertical cross section taken along lines 10—10 of FIG. 3.

As shown in FIGS. 7 and 10, an air passage 76 associated with the air duct 74 provides a passage for the air through the transverse beam 50 to the engine 28.

Vertical fender stabilizers 78, which serve to provide lateral stability, are located on either side of the automobile A, and also help to offset the pressure center toward the rear (FIG. 4). This provides correctional moment at high speeds during the loss of traction at all four wheels. A roll-over bar 82, as shown in FIGS. 3 and 4, is provided centrally of the automobile A and is supported by posts 84 to link the roll-over bar 82 with the longitudinal members 42 and 44 respectively. It is noted that the roll-over bar 82, as shown in FIG. 4, has a greater dimension at the belt height of the automobile than in the roof portion in order to protect against sideways impact.

Figure 8:
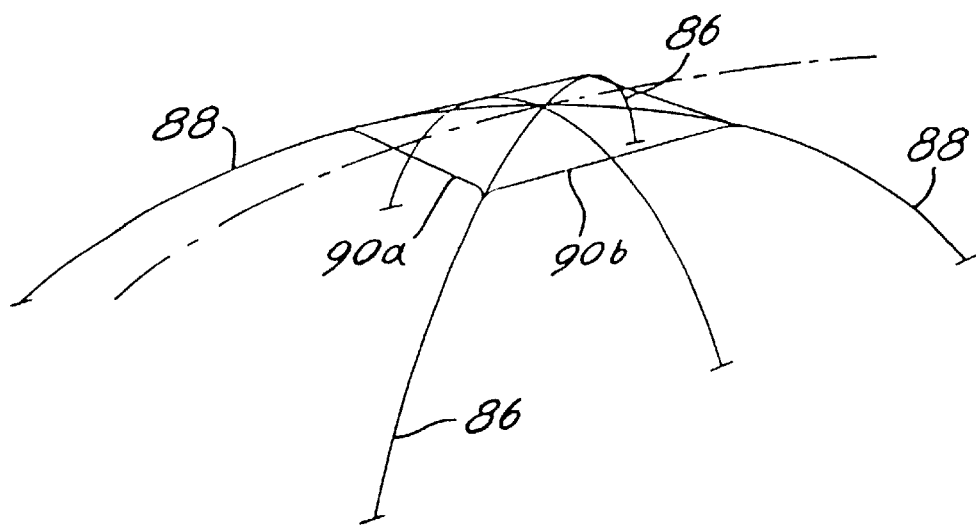
FIG. 8 is a schematic diagram in perspective showing a further characteristic of the present invention.

FIG. 8 represents the roof structure support construction which includes pillars 86 and 88 which cross each other and are supported at the belt line. Braces 90*a* and 90*b* represent the windshield and door braces.

There are bulkheads 92 at the front and rear of the automobile A over the lateral beams 46 and 48 as shown in FIGS. 3 and 5. These bulkheads represent the construction split lines of the automobile and are designed to contain the crash energy without serious deformation of the passenger cabin.

The portions fore of bulkhead 92 and aft of bulkhead 94 are crumble zones. Transversal leaf spring 96 is provided in bulkhead 92 to supplement the suspension system. As shown in FIG. 10 suspension link rods 98 and 100 are connected to the leaf spring 96 within the housing of bulkhead 92.

What is claimed is:

1. An automobile having a chassis and an outer cladding in the form of an airfoil with the top roof wall forming the pressure surface and the bottom wall forming the suction surface with the front of the automobile acting as a leading edge and in the rear, the trailing edge; the improvement comprising a pair of laterally extending bulkheads centrally of the chassis, the bulkheads having a V-shaped structure in a side elevation and forming a backrest for respective seats in the automobile, and a drive train suspended from the apex of the triangle formed by the V-shaped bulkheads within the space between the bulkheads centrally of the automobile, and wherein the drive chain includes an engine suspended at the floor level, a clutch, a differential, and a transmission superimposed one above the other in a vertical axis.

2. An automobile as defined in claim 1, wherein the engine is a lightweight radial engine extending in the horizontal plane and the differential is an inter axle differential with the transmission of a split power CVT type.

3. An automobile as defined in claim 2, wherein an air inlet is provided at the leading edge of the automobile and communicates with an air conduit directed to the engine for cooling the engine, and spent cooling air passes through a conduit extending to the trailing edge of the automobile, and fan means are provided in the exhaust conduit for drawing cooling air through the engine.

4. An automobile a defined in claim 1, wherein the chassis includes a housing forming a front and rear longitudinally extending tunnels for the power transmission elements to the front and rear axles of the automobile, the housing being integrated with the pair of laterally extending bulkheads to provide an integral rigid structure forming part of the chassis.

5. An automobile as defined in claim 1, wherein the front and rear wheels are driven by cogged belts extending from the differential in a möbius curve transmitting torque from the vertical axis of the interaxle differential to the horizontal axis of the front and rear axles of the automobile.

\* \* \* \* \*